US012297983B1

(12) United States Patent
Lu et al.

(10) Patent No.: US 12,297,983 B1
(45) Date of Patent: May 13, 2025

(54) HOLDER, LIGHT TUBE, LIGHTING DEVICE HAVING A MISTAKE-PROOF STRUCTURE, INSTALLATION METHOD AND MODIFYING METHOD THEREOF

(71) Applicant: Xiamen PVTECH Co., Ltd., Fujian (CN)

(72) Inventors: Fuxing Lu, Fujian (CN); Jinsheng Li, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/633,544

(22) Filed: Apr. 12, 2024

(30) Foreign Application Priority Data

Jan. 10, 2024 (CN) ........................ 202410038747.X

(51) Int. Cl.
*F21V 19/00* (2006.01)

(52) U.S. Cl.
CPC ...... *F21V 19/0085* (2013.01); *F21V 19/0005* (2013.01)

(58) Field of Classification Search
CPC ...... H01J 9/003; H01J 19/008; H01J 19/0005; H01J 19/04; H01J 19/0085
See application file for complete search history.

(56) References Cited

U.S. PATENT DOCUMENTS

2010/0015843 A1* 1/2010 Zayas ................ H01R 33/0854 439/375

* cited by examiner

*Primary Examiner* — Anne M Hines
(74) *Attorney, Agent, or Firm* — Winston Hsu

(57) ABSTRACT

A method for installing a lighting device having a mistake-proof structure includes the following steps: aligning the two end caps at the two ends of the tube body of a light tube with two holders; installing the two end caps on the two holders to make the extending space of each of the end caps be engaged with the extending portion of the rotational fixing element of the holder corresponding thereto; and making the two conductive pins of each of the end caps contact the two conductive plates in the holder body of the holder corresponding thereto.

17 Claims, 21 Drawing Sheets

HOLDER, LIGHT TUBE, LIGHTING DEVICE HAVING A MISTAKE-PROOF STRUCTURE, INSTALLATION METHOD AND MODIFYING METHOD THEREOF

BACKGROUND OF THE INVENTION

1. Field of the Invention

The present invention relates to a holder, in particular to a holder having a mistake-proof structure. The present invention also relates to a light tube matching the holder, and a lighting device having the holder and the light tube. The present invention further relates to the installation method and modifying method of the lighting device.

2. Description of the Prior Art

The replaceable light tubes are convenient in use, so these light tubes have been widely utilized in commercial buildings, industrial structures, or residences. However, some of currently available light tubes cannot be installed on installations bases equipped with electronic ballasts or those with preheating functions in inductive ballasts. If these light tubes are erroneously installed on such installation bases, these light tubes may be damaged or result in accidents such as fires. However, the currently available light tubes lack appropriate mistake-proof structures, so users tend to mistakenly install these light tubes on incompatible installation bases.

SUMMARY OF THE INVENTION

One embodiment of the present invention provides a method for installing a lighting device having a mistake-proof structure, which includes the following steps: aligning the two end caps at the two ends of the tube body of a light tube with two holders; installing the two end caps on the two holders to make the extending space of each of the end caps be engaged with the extending portion of the rotational fixing element of the holder corresponding thereto; and making the two conductive pins of each of the end caps contact the two conductive plates in the holder body of the holder corresponding thereto.

In one embodiment, the step of installing the two end caps on the two holders to make the extending space of each of the end caps be engaged with the extending portion of the rotational fixing element of the holder corresponding thereto further includes the following steps: making the two conductive pins of each of the end caps pass through two top holes of the holder body of the holder corresponding thereto; and inserting the two conductive pins of each of the end caps into the two positioning grooves of the rotational fixing element of the holder corresponding thereto.

In one embodiment, the step of making two conductive pins of each of the end caps contact the two conductive plates in the holder body of the holder corresponding thereto further includes the following step: rotating the light tube by a predetermined angle.

In one embodiment, the extending space is a groove, a hole, or recess formed by a slope.

In one embodiment, the extending portion is a positioning plate, a positioning block, or a positioning slope.

One embodiment of the present invention provides a lighting device modifying method, which includes the following steps: removing the two original end caps of the original light tube of a conventional lighting device; installing the two end caps on the two ends of the original light tube of the conventional lighting device, wherein each of the end caps has an extending space; removing the two original holders of the original installation base of the conventional lighting device; and installing two holders on the original installation base of the conventional lighting device, wherein each of the holders has an extending portion.

In one embodiment, the extending space is a groove, a hole, or recess formed by a slope.

In one embodiment, the extending portion is a positioning plate, a positioning block, or a positioning slope.

One embodiment of the present invention provides a lighting device having a mistake-proof structure, which includes two holders and a lighting tube. Each of the holders includes a holder body, two conductive plates disposed in the holder body, and a rotational fixing element disposed in a central recess of the holder body. The rotational fixing element has an extending portion. The light tube is electrically connected to the two conductive plates and having a tube body and two end caps disposed on the two ends of the tube body. The end caps are installed on one of the two holders respectively and each of the end caps has an extending space engaged with the extending portion of the rotational fixing element.

In one embodiment, the extending space is a groove or hole.

In one embodiment, each of the end caps further has two conductive pins inserted into the rotational fixing element corresponding thereto, such that the two conductive pins contact the two conductive plates.

In one embodiment, the two conductive pins are respectively disposed on the two sides of the extending space.

In one embodiment, the extending portion is a positioning plate, a positioning block, or a positioning slope.

One embodiment of the present invention provides a holder having a mistake-proof structure, which includes a holder body, two conductive plates and a rotational fixing element. The two conductive plates are disposed in the holder body. The rotational fixing element is disposed in the central recess of the holder body and having an extending portion.

In one embodiment, the extending portion is a positioning plate, a positioning block, or a positioning slope.

In one embodiment, the central recess of the holder body is provided with a central post, and the rotational fixing elements has a central hole. The central post passes through the central hole, such that the rotational fixing element is rotationally connected to the central post.

One embodiment of the present invention provides a light tube having a mistake-proof structure, which includes a tube body and two end caps. The two end caps are disposed at the two ends of the tube body. Each of the end caps has an extending space and two conductive pins.

In one embodiment, the extending space is a groove, a hole, or recess formed by a slope.

In one embodiment, the two conductive pins are disposed on one side of the extending space.

In one embodiment, the two conductive pins are respectively disposed on the two sides of the extending space.

The holder, light tube, lighting device having the mistake-proof structure, installation method and modifying method thereof in accordance with the embodiments of the present invention may have the following advantages:

(1) In one embodiment of the present invention, a lighting device includes two holders and a lighting tube. Each of the holders includes a holder body, two conductive plates disposed in the holder body, and a rotational fixing element disposed in a central recess of the holder body. The rotational fixing element has an extending portion. The light tube is electrically connected to the two conductive plates and having a tube body and two end caps disposed on the two ends of the tube body. The end caps are installed on one of the two holders respectively and each of the end caps has an extending space engaged with the extending portion of the rotational fixing element. The mistake-proof structure formed by the extending spaces of the end caps and the extending portions of the rotational fixing elements effectively provides a mistake-proof function, such that the holder can be only installed with a matching light tube. Consequently, the lighting device will not be damage due to incorrect installation, which significantly enhances the service life of the lighting device.

(2) In one embodiment of the present invention, the end caps and holders of the lighting device have a special structural design, so the light tube can be stably fixed on the holder. Consequently, the lighting device achieves high structural stability, which can effectively prevent the light tube from falling off the holder. Therefore, the service life of the lighting device can be extended so as to further enhance the safety of the lighting device.

(3) In one embodiment of the present invention, the rotational fixing element of the holder of the lighting device has an extending portion with a special structural design, such that the extending space of the end cap can be stably engaged with the extending portion of the rotational fixing element. This structural design further enhances the structural stability of the lighting device.

(4) In one embodiment of the present invention, the two conductive pins of each end cap of the light tube are disposed on the two sides of the extending space of the end cap. Therefore, when the user rotates the light tube, the extending portion of the rotational fixing element embedded in the extending space provides appropriate assistance to alleviate the force applied to the two conductive pins. As a result, the conductive pins are less prone to deformation during the user's rotation of the light tube.

(5) In one embodiment of the present invention, the structural design of the mistake-proof structure in the lighting device is simple, so the lighting device can achieve desired technical effects without significantly increasing the cost thereof. Consequently, the practicality of the lighting device is significantly improved, so the lighting device can be more comprehensive in application and meet actual requirements.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
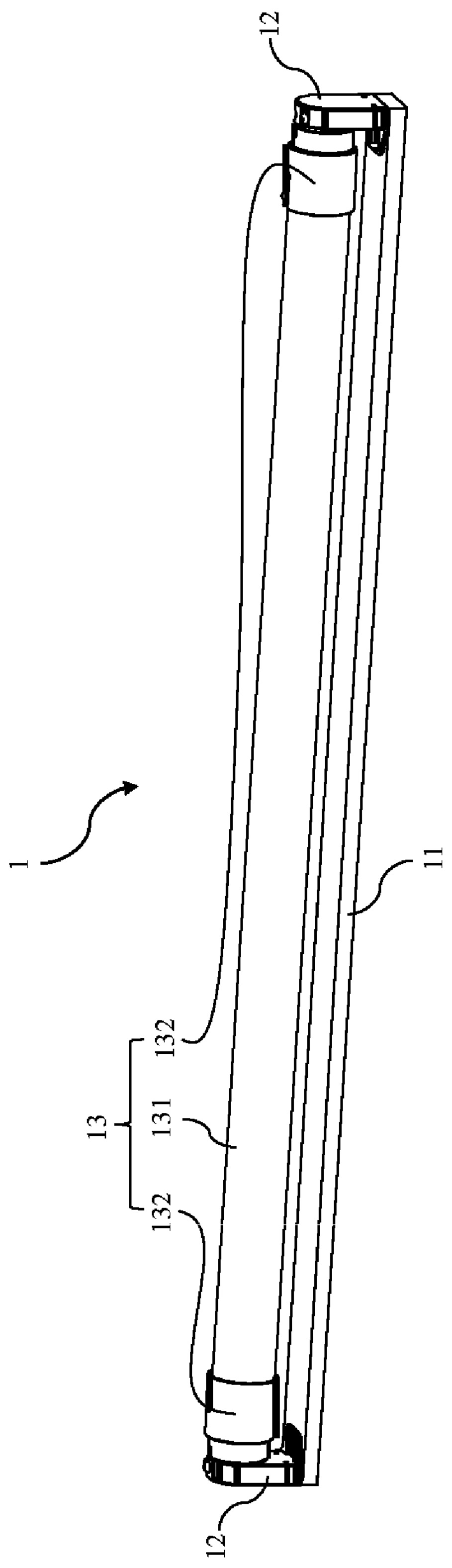
FIG. 1 is a perspective view of a lighting device having a mistake-proof structure in accordance with a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a perspective view of a lighting device having a mistake-proof structure in accordance with a first embodiment of the present invention. As shown in FIG. 1, the lighting device 1 includes an installation base 11, two holders 12, and a light tube 13. The light tube 13 is installed on the two holders 12, which are fixed on the installation base 11. The light tube 13 has a tube body 131 and two end caps 132 disposed at the two ends of the tube body 131. The two end caps 132 are respectively installed on the two holders 12.

The embodiment just exemplifies the present invention and is not intended to limit the scope of the present invention; any equivalent modification and variation according to the spirit of the present invention is to be also included within the scope of the following claims and their equivalents.

Figure 2:
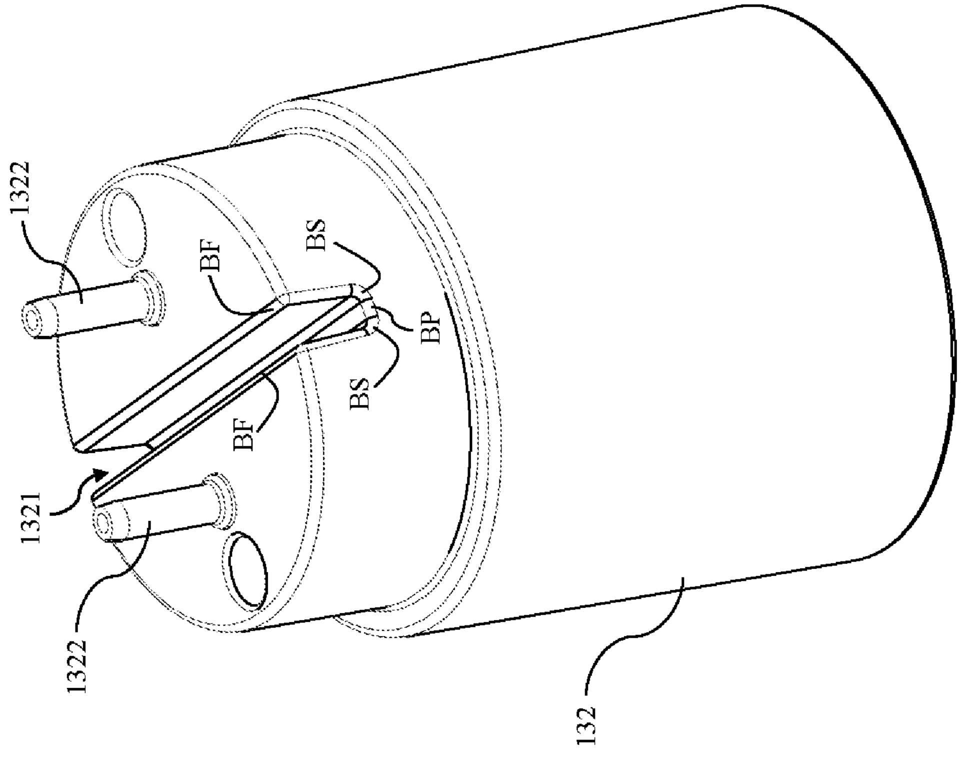
FIG. 2 is a perspective view of an end cap of the lighting device having the mistake-proof structure in accordance with the first embodiment of the present invention.

Please refer to FIG. 2, which is a perspective view of an end cap of the lighting device having the mistake-proof structure in accordance with the first embodiment of the present invention. As shown in FIG. 2, the end cap 132 has two conductive pins 1322 and an extending space 1321. The two conductive pins 1322 are disposed at the two sides of the extending space 1321. The conductive pins 1322 can be made of a metal material such as copper, iron, aluminum, or other conductive alloy materials. In this embodiment, the extending space 1321 is a groove. The bottom surface of the extending space 1321 has a bottom plane BP and two inclined bottom surfaces BS. The bottom plane BP is disposed between the two inclined bottom surfaces BS. The top end of the extending space 1321 has two buffer surfaces BF. In another embodiment, the extending space 1321 can also be a hole, such as a circular hole, a rectangular hole, or holes of various shapes. In yet another embodiment, the extending space 1321 can be a concave surface, a concave point, a concave stair structure, an inclined plane, or various structures with similar functions. The above structure of the extending space 1321 is just for illustration, which may vary according to actual requirements; the present invention is not limited thereto.

The embodiment just exemplifies the present invention and is not intended to limit the scope of the present invention; any equivalent modification and variation according to the spirit of the present invention is to be also included within the scope of the following claims and their equivalents.

Figure 3:
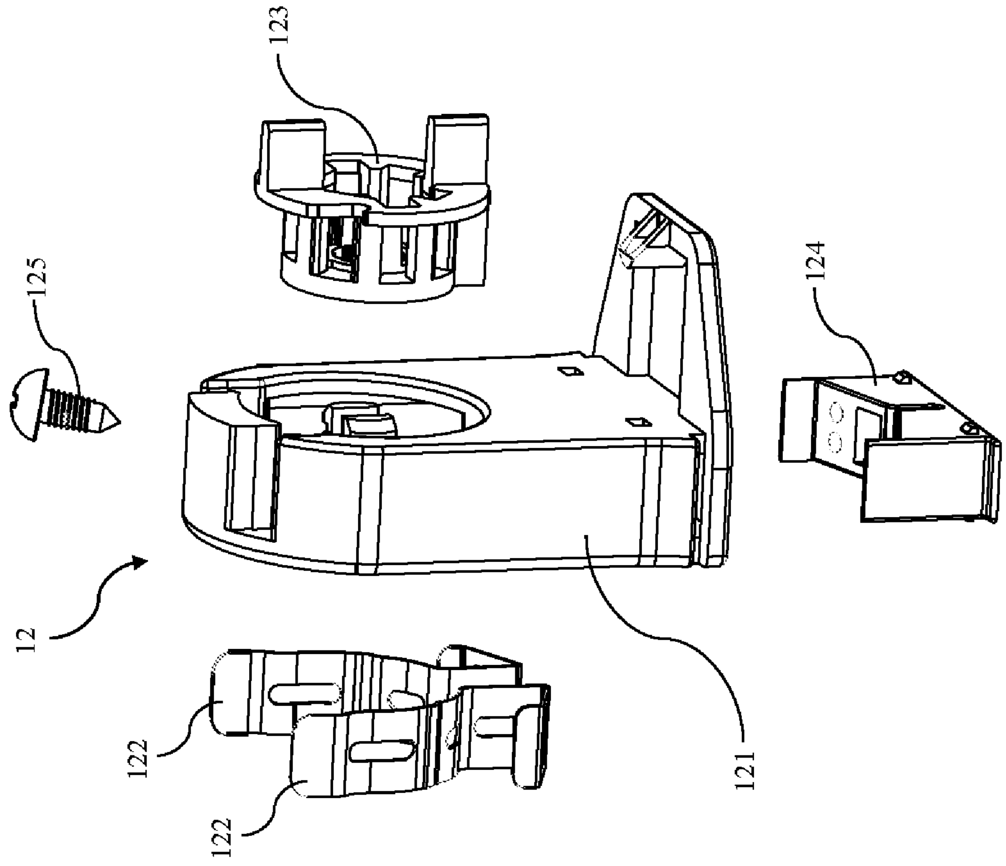
FIG. 3 is an exploded view of a holder of the lighting device having the mistake-proof structure in accordance with the first embodiment of the present invention.
Figure 4:
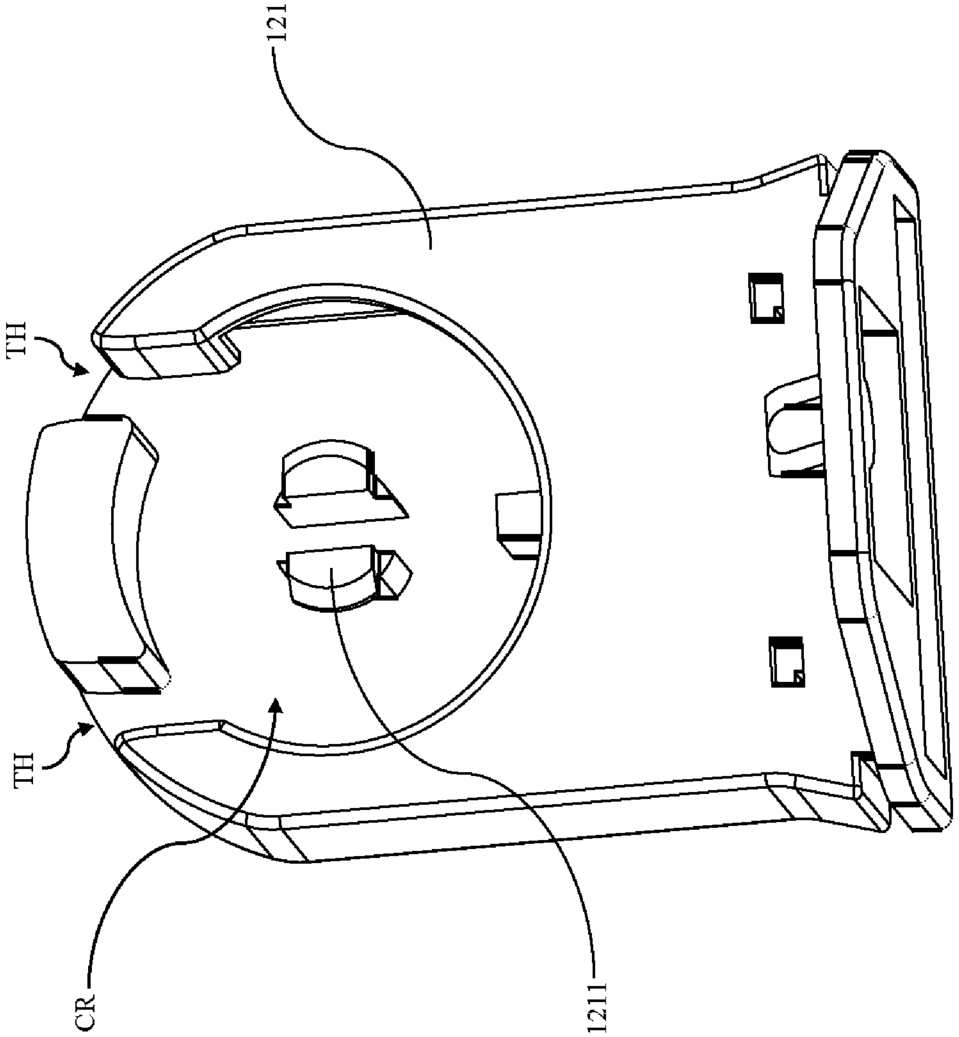
FIG. 4 is a perspective view of the holder of the lighting device having the mistake-proof structure in accordance with the first embodiment of the present invention.
Figure 5:
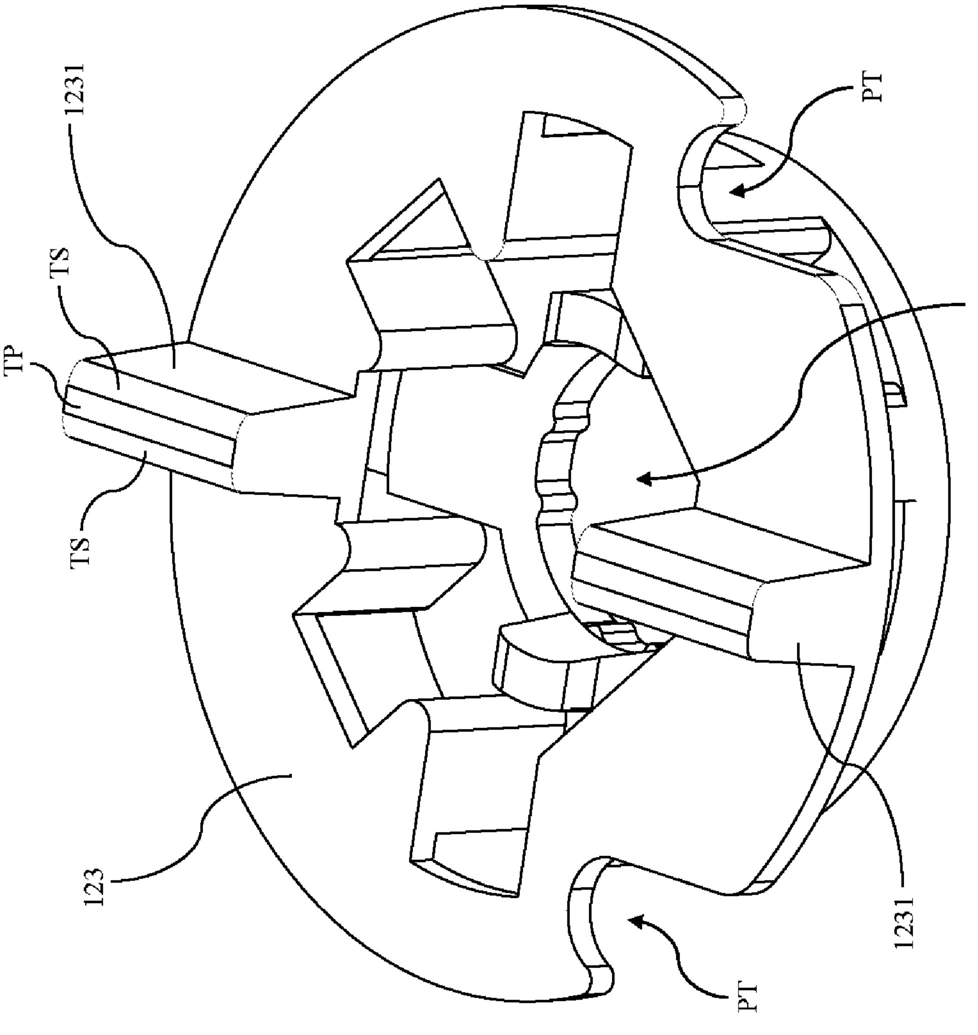
FIG. 5 is a perspective view of a rotational fixing element of the lighting device having the mistake-proof structure in accordance with the first embodiment of the present invention.
Figure 6:
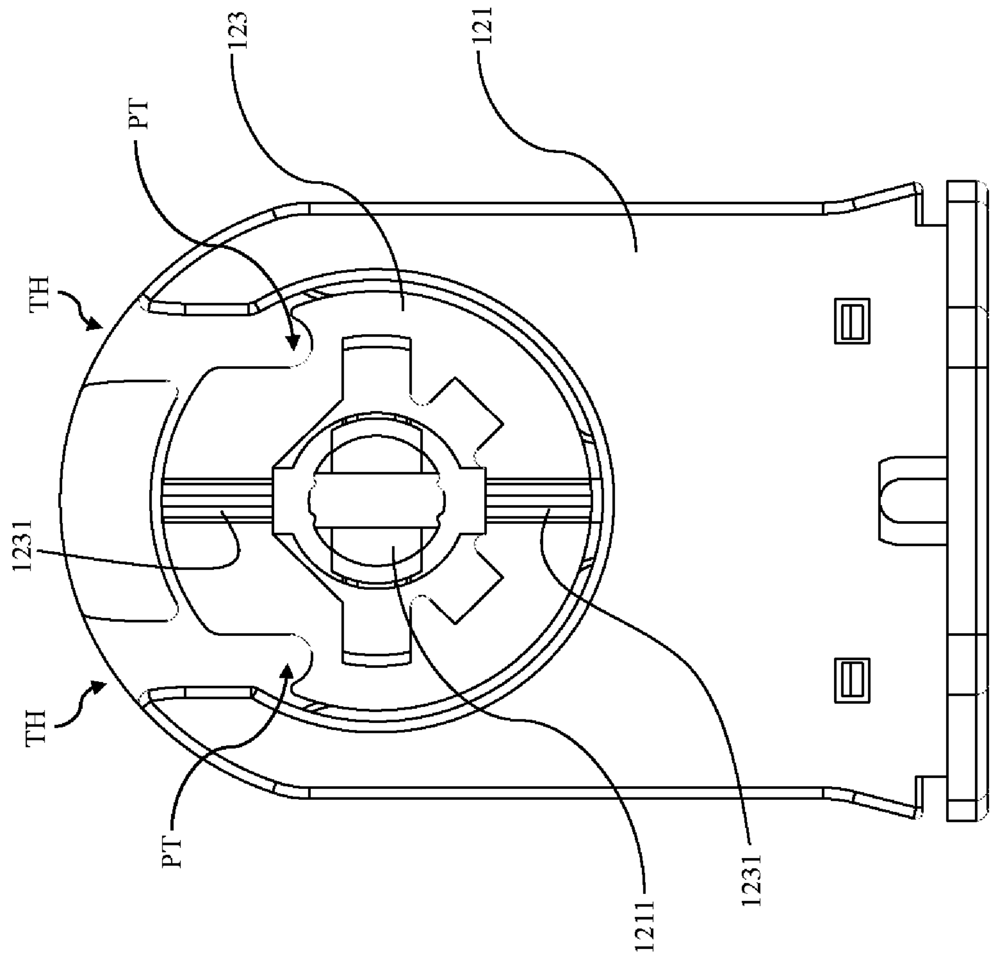
FIG. 6 is an assembly view of the rotational fixing element and the holder of the lighting device having the mistake-proof structure in accordance with the first embodiment of the present invention.

Please refer to FIG. 3, FIG. 4, FIG. 5 and FIG. 6. FIG. 3 is an exploded view of a holder of the lighting device having the mistake-proof structure in accordance with the first embodiment of the present invention. FIG. 4 is a perspective view of the holder of the lighting device having the mistake-proof structure in accordance with the first embodiment of the present invention. FIG. 5 is a perspective view of a rotational fixing element of the lighting device having the mistake-proof structure in accordance with the first embodiment of the present invention. FIG. 6 is an assembly view of the rotational fixing element and the holder of the lighting device having the mistake-proof structure in accordance with the first embodiment of the present invention. As shown in FIG. 3, FIG. 4, FIG. 5 and FIG. 6, the holder 12 includes a holder body 121, two conductive plates 122, a rotational fixing element 123, a fixing base 124, and a fixing element 125.

The central recess CR of the holder body 121 is provided with a central post 1211, and the top of the holder body 121 is provided with two top holes TH.

The two conductive plates 122 and the fixing base 124 are disposed in the holder body 121, with the conductive plates 122 fixed to the fixing base 124. The two conductive plates 122 may be made of a metal material, such as copper, iron, aluminum or other conductive alloy materials.

The rotational fixing element 123 is disposed in the central recess CR of the holder body 121 and has two extending portions 1231, a central hole CH, and two positioning grooves PT. The central post 1211 of the holder body 121 passes through the central hole CH of the rotational fixing element 123, such that the rotational fixing element 123 can be rotatably connected to the central post 1211. The two positioning grooves PT are corresponding to the two top holes TH and are disposed at the two sides of one of the extending portions 1231. Therefore, the holder 22 may be based on a two-channel design. In the embodiment, the extending portions 1231 may be a positioning plate and disposed on the upper surface of the rotational fixing element 123, and the width of the extending portion 1231 gradually decreases toward the direction away from the upper surface of the rotational fixing element 123. The surface at the top of the extending portion 1231 has a top plane TP and two inclined top surfaces TS, and the top plane TP is disposed between the two inclined top surfaces TS. In another embodiment, the extending portion 1231 may be a positioning block, which can be a cylindrical body, a polygonal body, or other shapes. In yet another embodiment, the extending portion 1231 can also be a protruded stage, a protruded point, a protruded stair structure, an inclined plane, a snap-fit structure, or various structures with similar functions. The total length of the two extending portions 1231 may be greater than half the length of the extending space 1321, and the two extending portions 1231 are designed to be mutually symmetrical. The above structure of the extending portion 1231 is just for illustration, which can vary according to actual requirements; the present invention is not limited thereto.

The embodiment just exemplifies the present invention and is not intended to limit the scope of the present invention; any equivalent modification and variation according to the spirit of the present invention is to be also included within the scope of the following claims and their equivalents.

Figure 7:
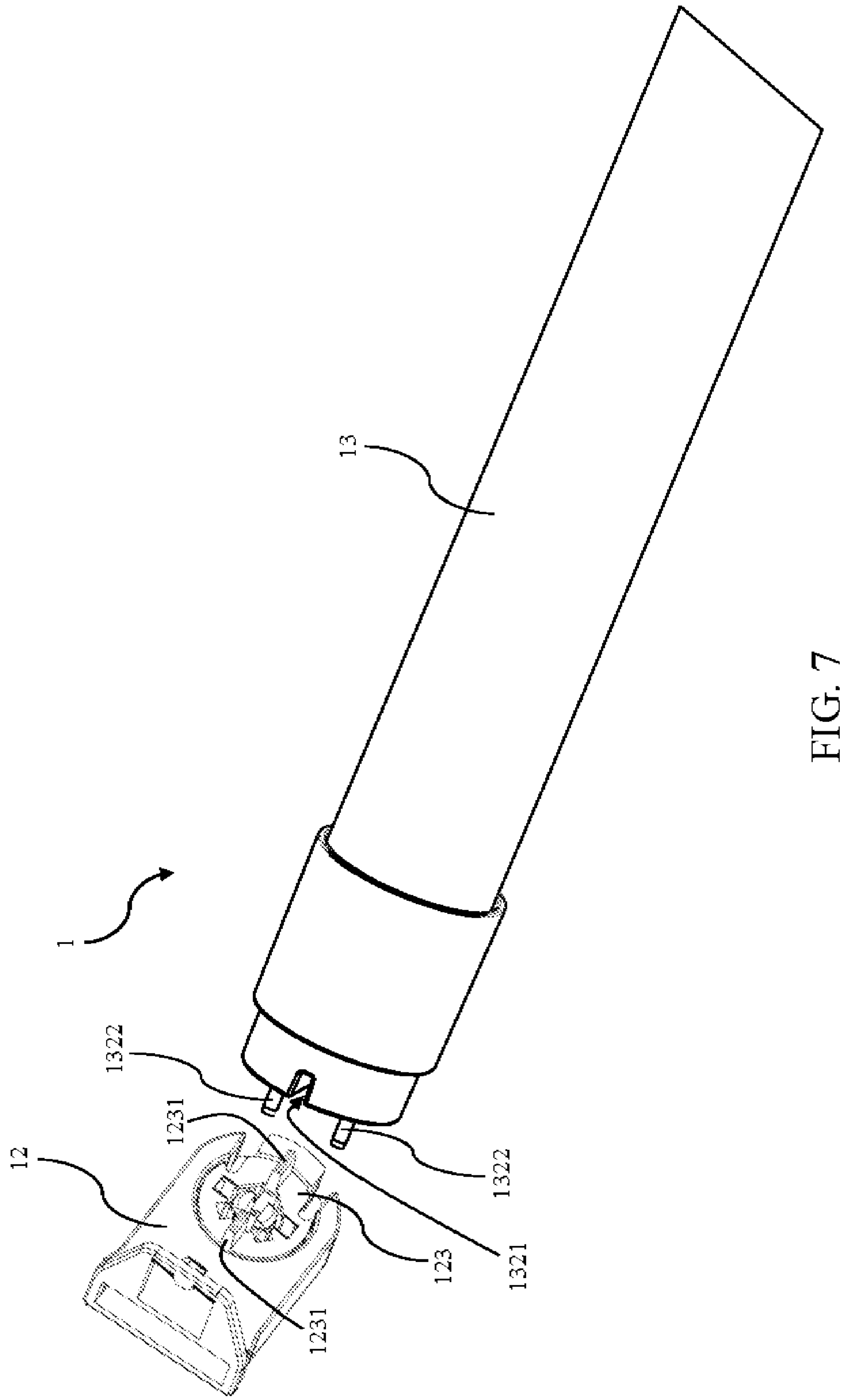
FIG. 7 is a first schematic view of a usage state of the lighting device having the mistake-proof structure in accordance with the first embodiment of the present invention.
Figure 8:
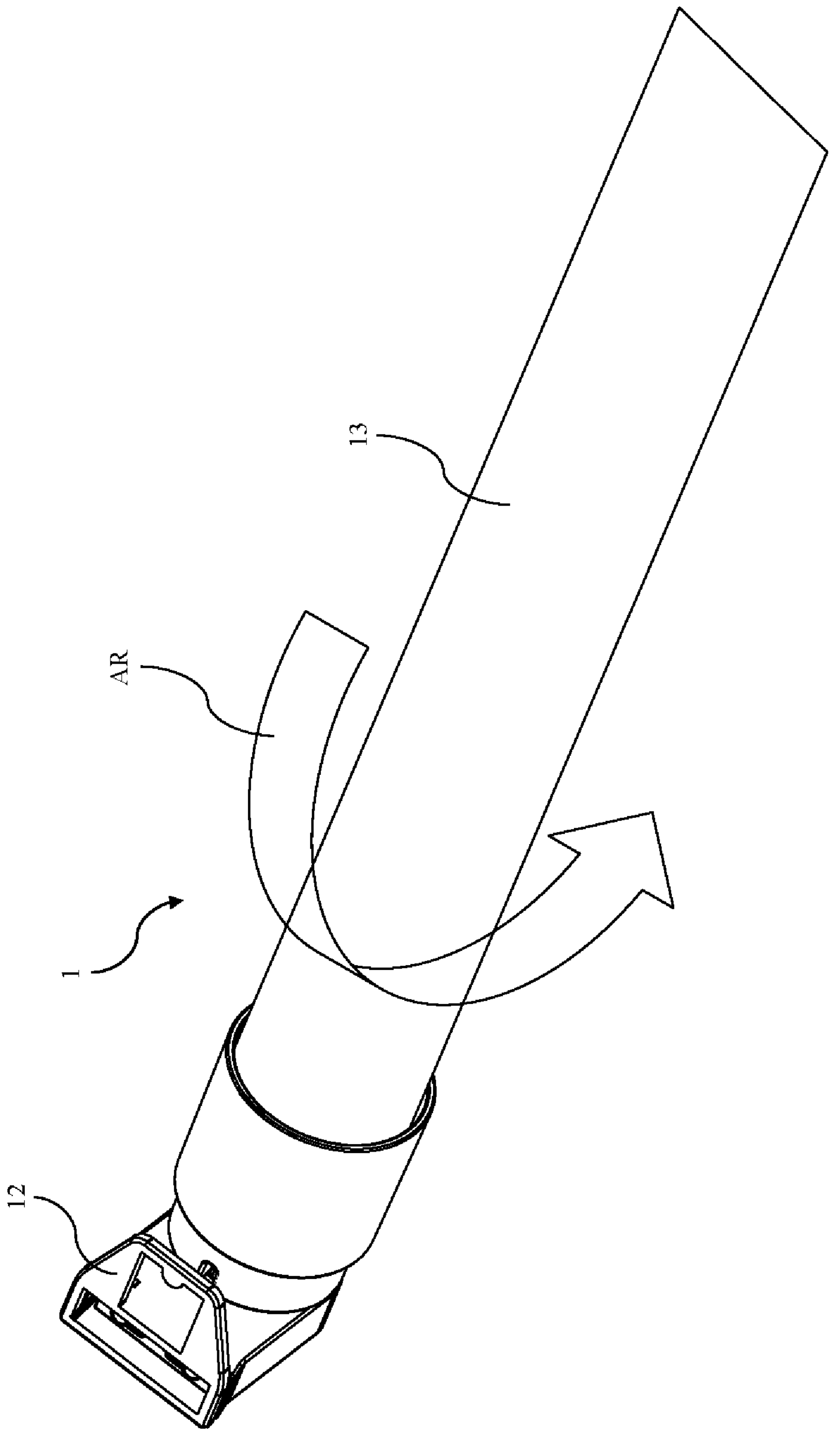
FIG. 8 is a second schematic view of the usage state of the lighting device having the mistake-proof structure in accordance with the first embodiment of the present invention.

Please refer to FIG. 7 and FIG. 8, which are a first schematic view and a second schematic view of a usage state of the lighting device having the mistake-proof structure in accordance with the first embodiment of the present invention respectively. Please also refer to FIG. 1~FIG. 6. As shown in FIG. 7 and FIG. 8, when a user intends to install the light tube 13 onto the holder 12, the user aligns the two conductive pins 1322 of each end cap 132 with the two top holes TH of the corresponding holder body 121, such that the conductive pins 1322 can pass through the top holes TH and be inserted into the positioning grooves PT of the rotational fixing element 123 of the holder 12. Simultaneously, the two extending portions 1231 of the rotational fixing element 123 are engaged with the extending spaces 1321 of the end caps 132. Subsequently, the user can rotate the light tube 13 by a predetermined angle (in the direction indicated by arrow AR, which can be clockwise or counter-clockwise) so that the two conductive pins 1322 of each end cap 132 make contact with the two conductive plates 122 inside the holder body 121, establishing electrical connection between the light tube 13 and the conductive plates 122 of the holder 12. Finally, the user can fix the fixing element 125 at one of the top holes TH of the holder body 121 to prevent the light tube 13 from falling.

According to the embodiment, involving the extending spaces 1321 of the end caps 132 and the extending portions 1231 of the rotational fixing element 123, constitutes a mistake-proof structure that effectively provides a mistake-proof function. In this way, that the light tube 13 can be installed on a matching holder 12. Consequently, the lighting device 1 is safeguarded against damage due to incorrect installation, so the service life of the lighting device 1 can be significantly increased. Additionally, the special structural design of the end caps 132 and the holder 12 ensures a secure fixation of the light tube 13 onto the holder 12, achieving high structural stability and effectively preventing the light tube 13 from falling. Moreover, the rotational fixing element 123 of the holder 12 features extending portions 1231 with a special structural design, allowing them to securely be engaged with the extending spaces 1321 of the end caps 132. As mentioned earlier, the two conductive pins 1322 of each end cap 132 are disposed on the two sides of the extending space 1321 respectively. Furthermore, the total length of the two extending portions 1231 may be greater than half the length of the extending space 1321, and the two extending portions 1231 are symmetrically designed. Consequently, when the user rotates the light tube 13, the extending portions 1231 of the rotational fixing element 123 embedded in the extending space 1321 can provide appropriate assistance to alleviate the force exerted on the two conductive pins 1322. Therefore, the conductive pins 1322 are less prone to deformation when the user rotates the light tube 13.

This structural design can effectively prevent the user from installing a conventional light tube onto the holder of an emergency lighting device. This structural design can also effectively prevent the user from installing the light tube of an emergency lighting device onto the holder of a conventional lighting device. Therefore, the structure enhances the safety of the lighting device, preventing damage to the device.

The embodiment just exemplifies the present invention and is not intended to limit the scope of the present invention; any equivalent modification and variation according to the spirit of the present invention is to be also included within the scope of the following claims and their equivalents.

Figure 9:
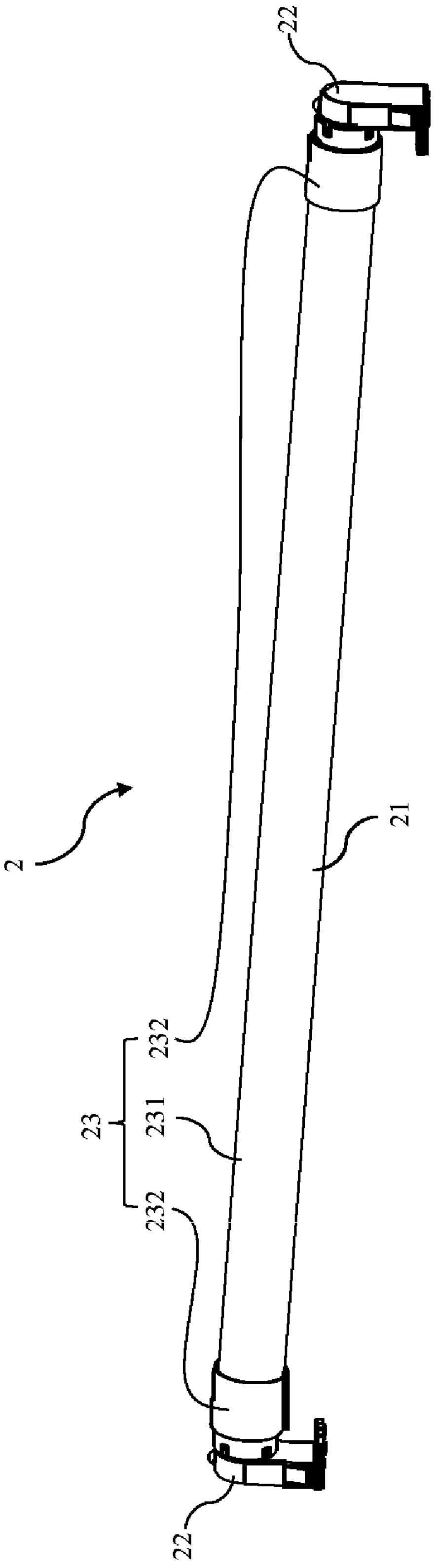
FIG. 9 is a perspective view of a lighting device having a mistake-proof structure in accordance with a second embodiment of the present invention.

Please refer to FIG. 9, which is a perspective view of a lighting device having a mistake-proof structure in accordance with a second embodiment of the present invention. As shown in FIG. 9, the lighting device 2 includes an installation base 21, two holders 22, and a light tube 23. The light tube 23 is installed on the two holders 22, which are fixed on the installation base 21. The light tube 23 has a tube body 231 and two end caps 232 disposed at the two ends of the tube body 231. The two end caps 232 are respectively installed on the two holders 22.

The embodiment just exemplifies the present invention and is not intended to limit the scope of the present invention; any equivalent modification and variation according to the spirit of the present invention is to be also included within the scope of the following claims and their equivalents.

Figure 10:
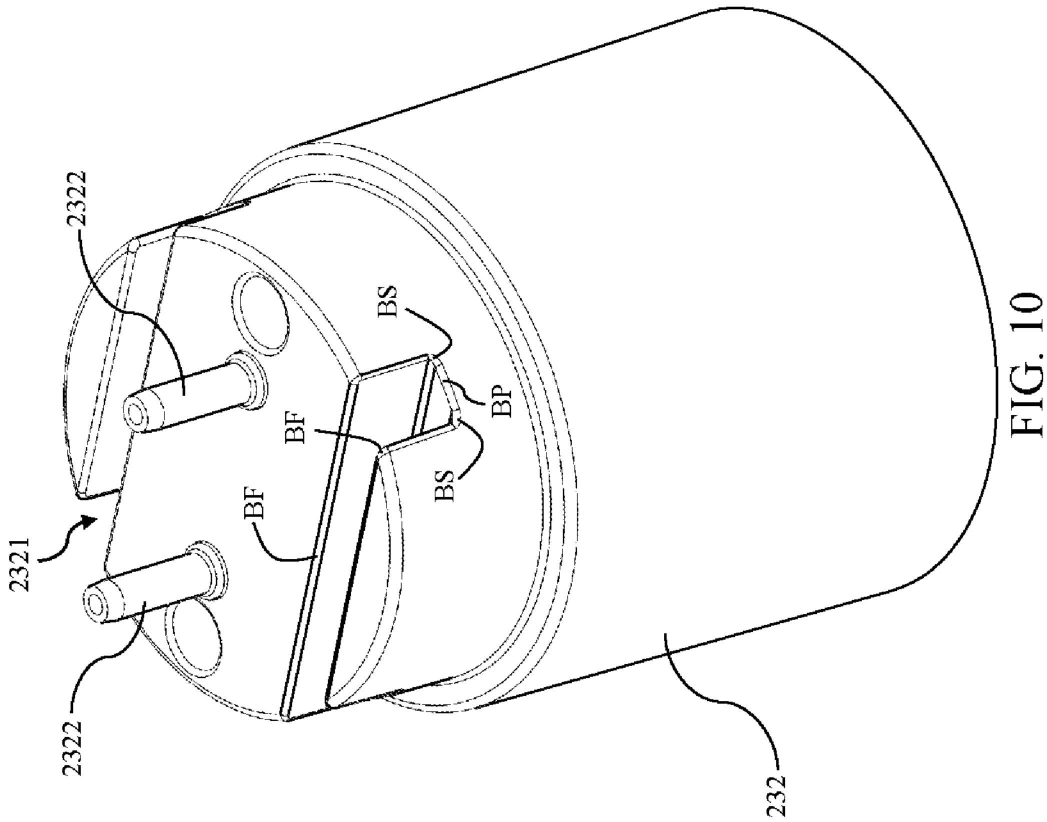
FIG. 10 is a perspective view of an end cap of the lighting device having the mistake-proof structure in accordance with the second embodiment of the present invention.

Please refer to FIG. 10, which is a perspective view of an end cap of the lighting device having the mistake-proof structure in accordance with the second embodiment of the present invention. As shown in FIG. 10, the end cap 232 has two conductive pins 2322 and two extending spaces 2321. The two conductive pins 2322 are disposed between the two extending spaces 2321. One of the two conductive pins 2322 is disposed at one side of one of the extending spaces 2321, and the other one of the two conductive pins 2322 is disposed at one side of the other one of the extending spaces 2321. The conductive pins 2322 can be made of a metal material such as copper, iron, aluminum, or other conductive alloy materials. In this embodiment, the extending space 2321 is a groove. The bottom surface of the extending space 2321 has a bottom plane BP and two inclined bottom surfaces BS. The bottom plane BP is disposed between the two inclined bottom surfaces BS. The top end of the extending space 1321 has two buffer surfaces BF. In another embodiment, the extending space 1321 can also be a hole, such as a circular hole, a rectangular hole, or holes of various shapes. In yet another embodiment, the extending space 1321 can be a concave surface, a concave point, a concave stair structure, an inclined plane, or various structures with similar functions. The above structure of the extending space 1321 is just for illustration, which may vary according to actual requirements; the present invention is not limited thereto.

The embodiment just exemplifies the present invention and is not intended to limit the scope of the present invention; any equivalent modification and variation according to the spirit of the present invention is to be also included within the scope of the following claims and their equivalents.

Figure 11:
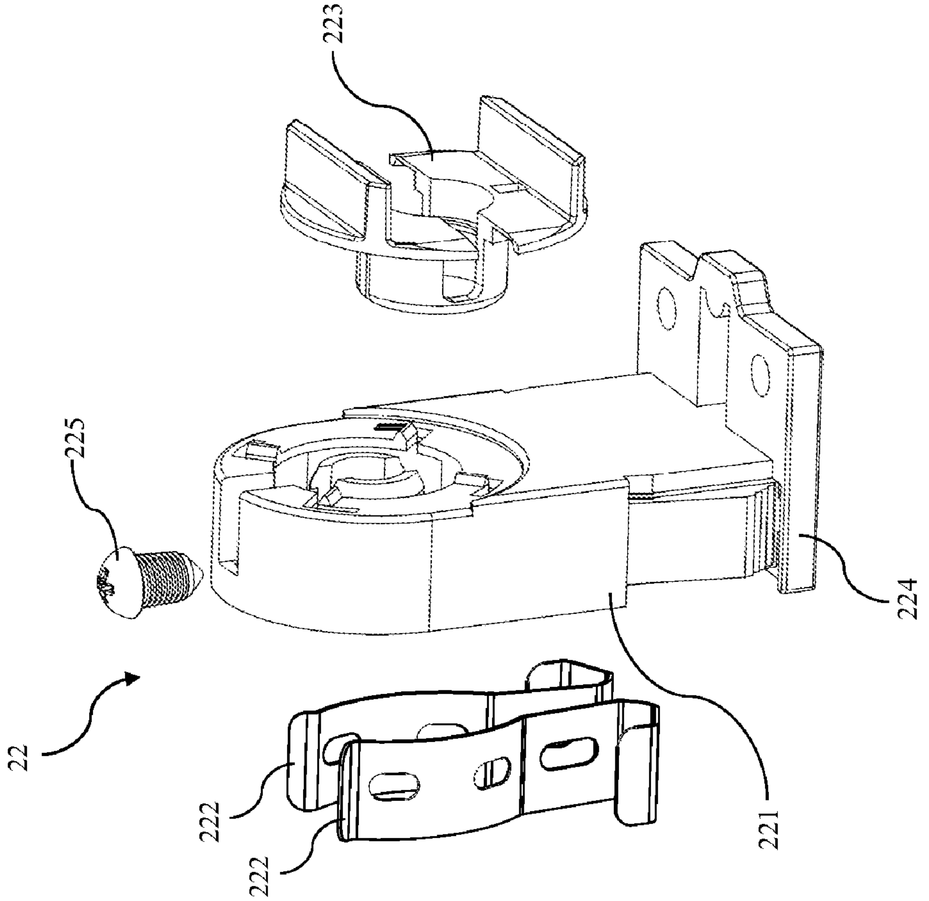
FIG. 11 is an exploded view of a holder of the lighting device having the mistake-proof structure in accordance with the second embodiment of the present invention.
Figure 12:
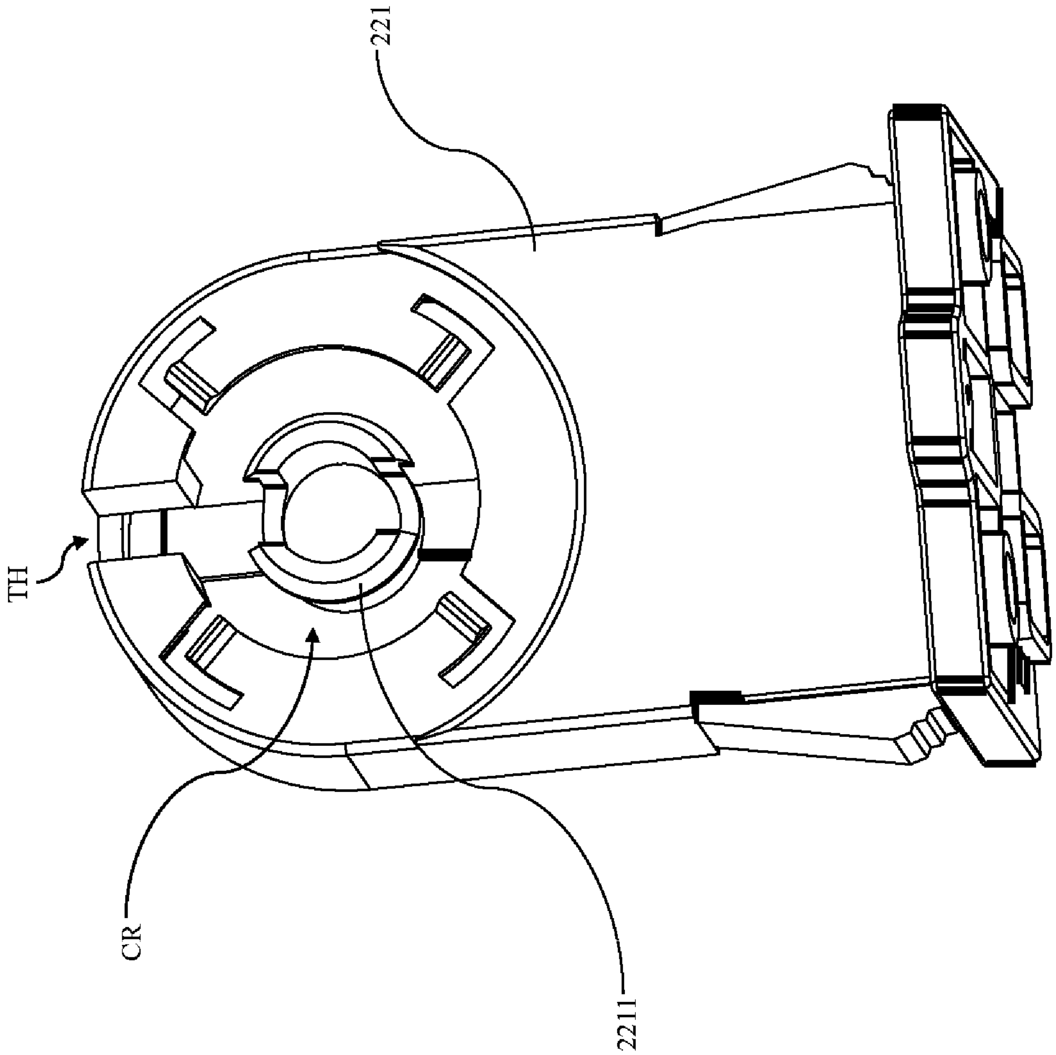
FIG. 12 is a perspective view of the holder of the lighting device having the mistake-proof structure in accordance with the second embodiment of the present invention.
Figure 13:
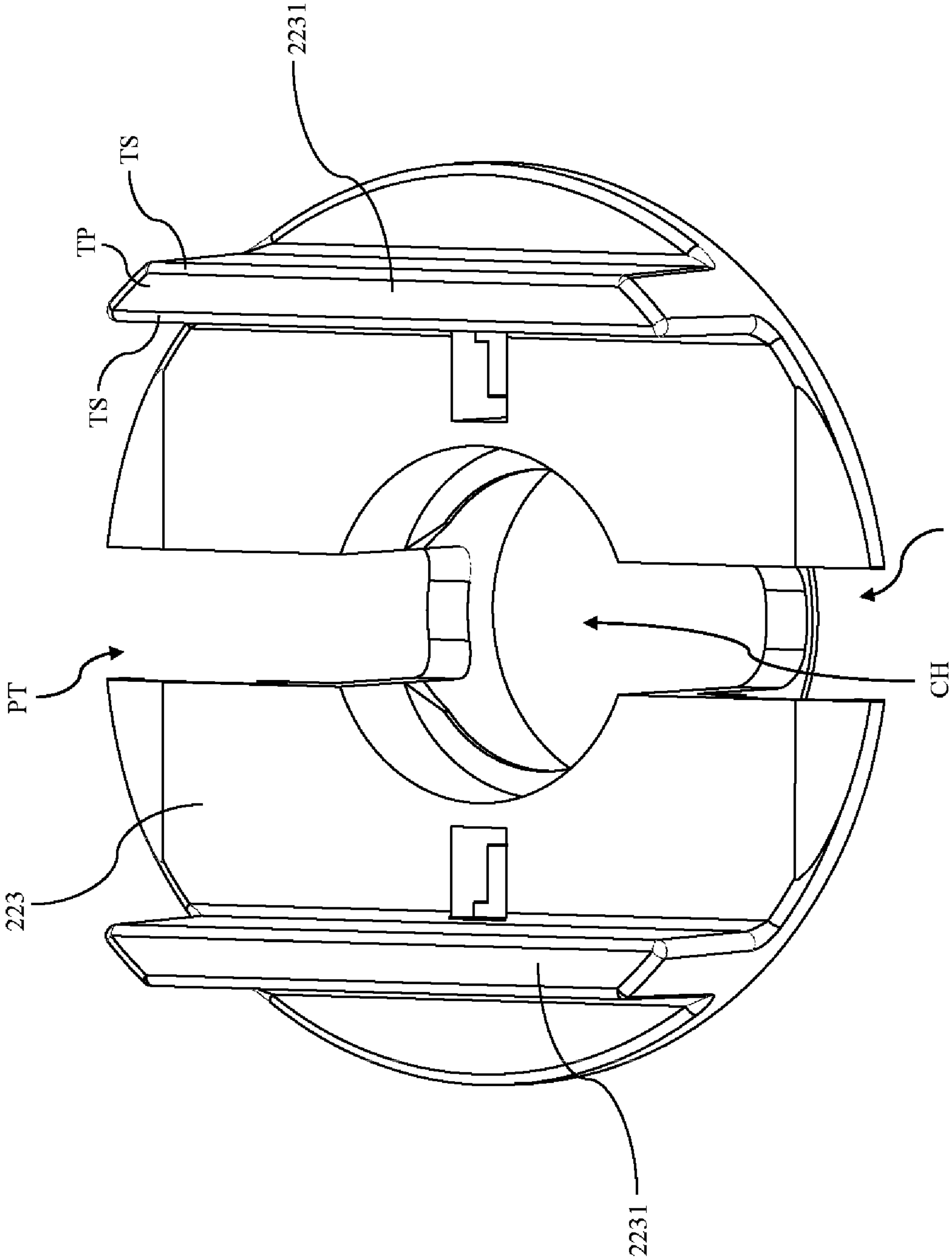
FIG. 13 is a perspective view of a rotational fixing element of the lighting device having the mistake-proof structure in accordance with the second embodiment of the present invention.
Figure 14:
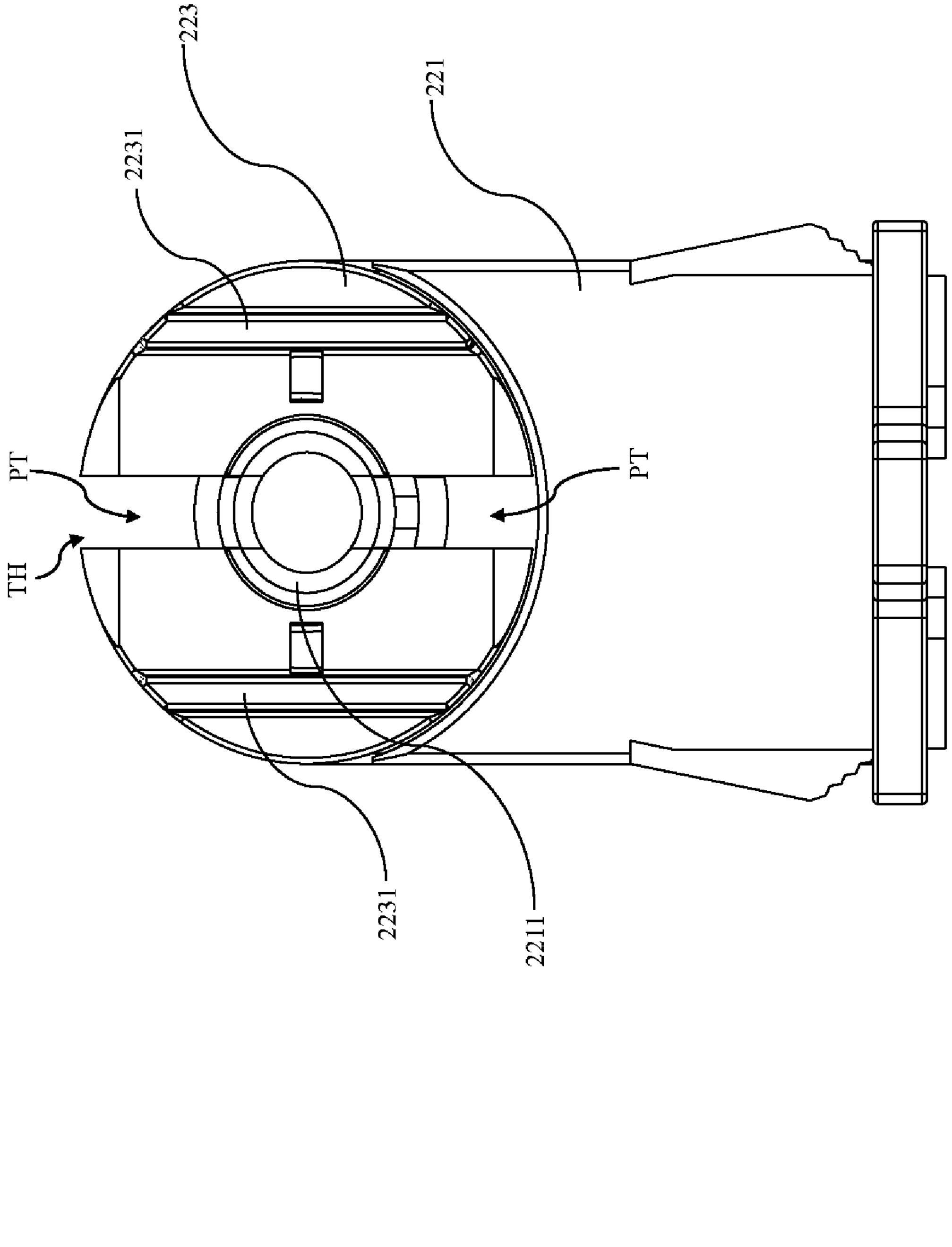
FIG. 14 is an assembly view of the rotational fixing element and the holder of the lighting device having the mistake-proof structure in accordance with the second embodiment of the present invention.
Figure 15:
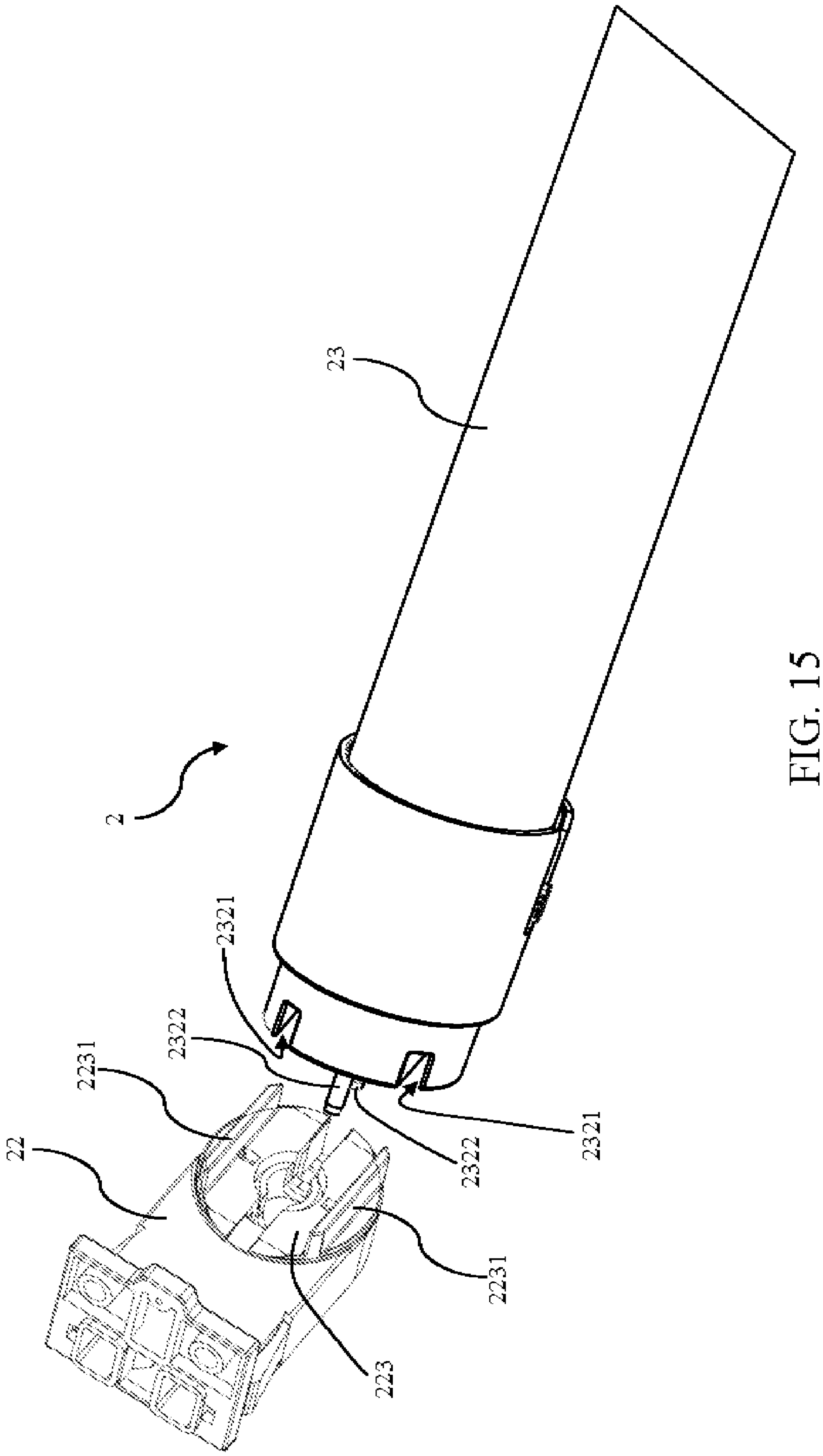
FIG. 15 is a first schematic view of a usage state of the lighting device having the mistake-proof structure in accordance with the second embodiment of the present invention.

Please refer to FIG. 11, FIG. 12, FIG. 13 and FIG. 14. FIG. 11 is an exploded view of a holder of the lighting device having the mistake-proof structure in accordance with the second embodiment of the present invention. FIG. 12 is a perspective view of the holder of the lighting device having the mistake-proof structure in accordance with the second embodiment of the present invention. FIG. 13 is a perspective view of a rotational fixing element of the lighting device having the mistake-proof structure in accordance with the second embodiment of the present invention. FIG. 14 is an assembly view of the rotational fixing element and the holder of the lighting device having the mistake-proof structure in accordance with the second embodiment of the present invention. As shown in FIG. 11, FIG. 12, FIG. 13 and FIG. 14, the holder 22 includes a holder body 221, two conductive plates 222, a rotational fixing element 223, a fixing base 224, and a fixing element 225.

The central recess CR of the holder body 221 is provided with a central post 2211, and the top of the holder body 2121 is provided with a top hole TH.

The two conductive plates 222 and the fixing base 224 are disposed in the holder body 221, with the conductive plates 222 fixed to the fixing base 224. The two conductive plates 222 may be made of a metal material, such as copper, iron, aluminum or other conductive alloy materials.

The rotational fixing element 223 is disposed in the central recess CR of the holder body 221 and has two extending portions 2231, a central hole CH, and two positioning grooves PT. The central post 2211 of the holder body 221 passes through the central hole CH of the rotational fixing element 223, such that the rotational fixing element 223 can be rotatably connected to the central post 2211. The two positioning grooves PT is corresponding to the top hole TH and are disposed to be opposite to each other; the central hole CH serves as the central point of the two positioning grooves PT. In this way, the central hole TH and the central hole CH can form a channel. Therefore, the holder 22 may be based on a one-channel design. In the embodiment, the extending portions 2231 may be a positioning plate and disposed on the upper surface of the rotational fixing element 223, and the width of the extending portion 2231 gradually decreases toward the direction away from the upper surface of the rotational fixing element 223. The surface at the top of the extending portion 2231 has a top plane TP and two inclined top surfaces TS, and the top plane TP is disposed between the two inclined top surfaces TS. In another embodiment, the extending portion 2231 may be a positioning block, which can be a cylindrical body, a polygonal body, or other shapes. In yet another embodiment, the extending portion 2231 can also be a protruded stage, a protruded point, a protruded stair structure, an inclined plane, a snap-fit structure, or various structures with similar functions. The total length of the two extending portions 2231 may be greater than half the length of the extending space 2321, and the two extending portions 2231 are designed to be mutually symmetrical. The above structure of the extending portion 2231 is just for illustration, which can vary according to actual requirements; the present invention is not limited thereto.

The embodiment just exemplifies the present invention and is not intended to limit the scope of the present invention; any equivalent modification and variation according to the spirit of the present invention is to be also included within the scope of the following claims and their equivalents.

Figure 16:
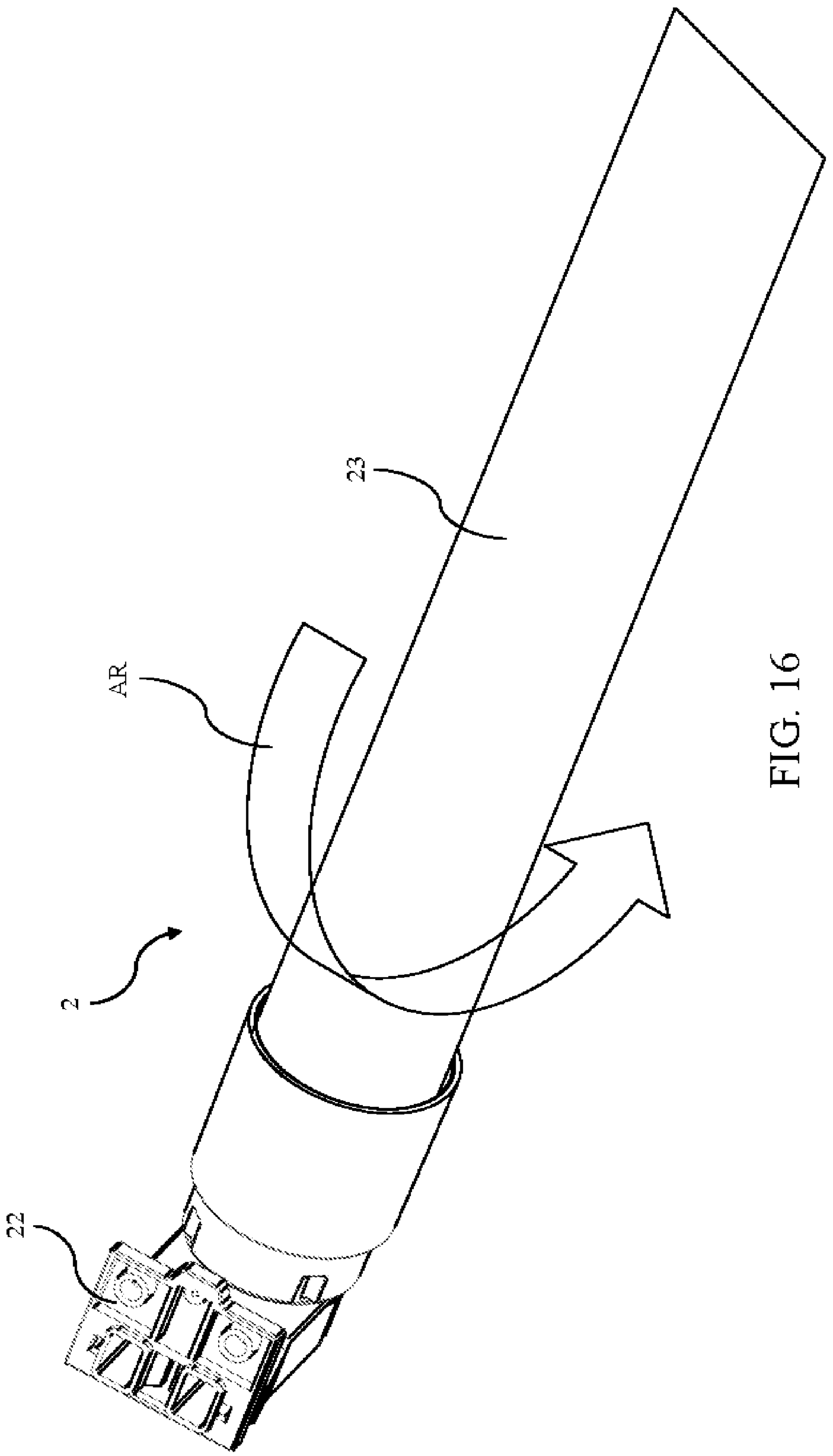
FIG. 16 is a second schematic view of the usage state of the lighting device having the mistake-proof structure in accordance with the second embodiment of the present invention.
Figure 17:
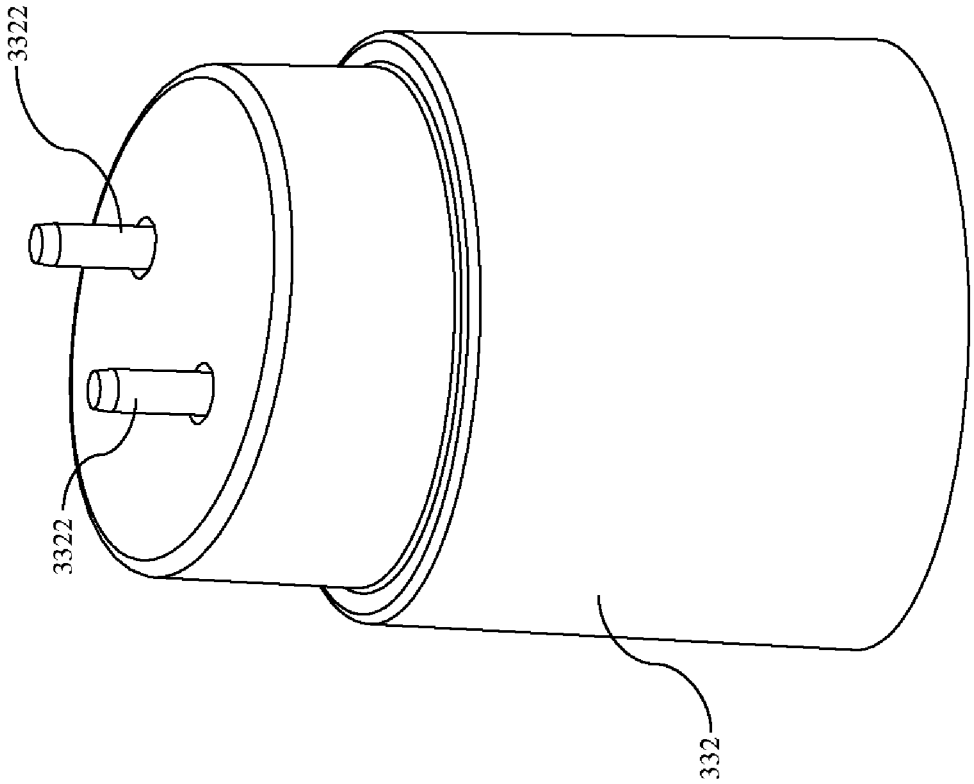
FIG. 17 is a perspective view of an end cap of the lighting device having the mistake-proof structure in accordance with a third embodiment of the present invention.

Please refer to FIG. 16 and FIG. 17, which are a first schematic view and a second schematic view of a usage state of the lighting device having the mistake-proof structure in accordance with the second embodiment of the present invention respectively. Please also refer to FIG. 9~FIG. 14. As shown in FIG. 16 and FIG. 17, when a user intends to install the light tube 23 onto the holder 22, the user aligns the two conductive pins 2322 of each end cap 232 with the top hole TH of the corresponding holder body 221, such that the conductive pins 2322 can pass through the top hole TH and be inserted into the positioning grooves PT of the rotational fixing element 223 of the holder 22. Simultaneously, the two extending portions 2231 of the rotational fixing element 223 are engaged with the extending spaces 2321 of the end caps 232. Subsequently, the user can rotate the light tube 23 by a predetermined angle (in the direction indicated by arrow AR, which can be clockwise or counterclockwise) so that the two conductive pins 2322 of each end cap 232 make contact with the two conductive plates 222 inside the holder body 221 in order to establish electrical connection between the light tube 23 and the conductive plates 222 of the holder 22. Finally, the user can fix the fixing element 225 at the top hole TH of the holder body 221 to prevent the light tube 23 from falling.

The embodiment just exemplifies the present invention and is not intended to limit the scope of the present invention; any equivalent modification and variation according to the spirit of the present invention is to be also included within the scope of the following claims and their equivalents.

Figure 18:
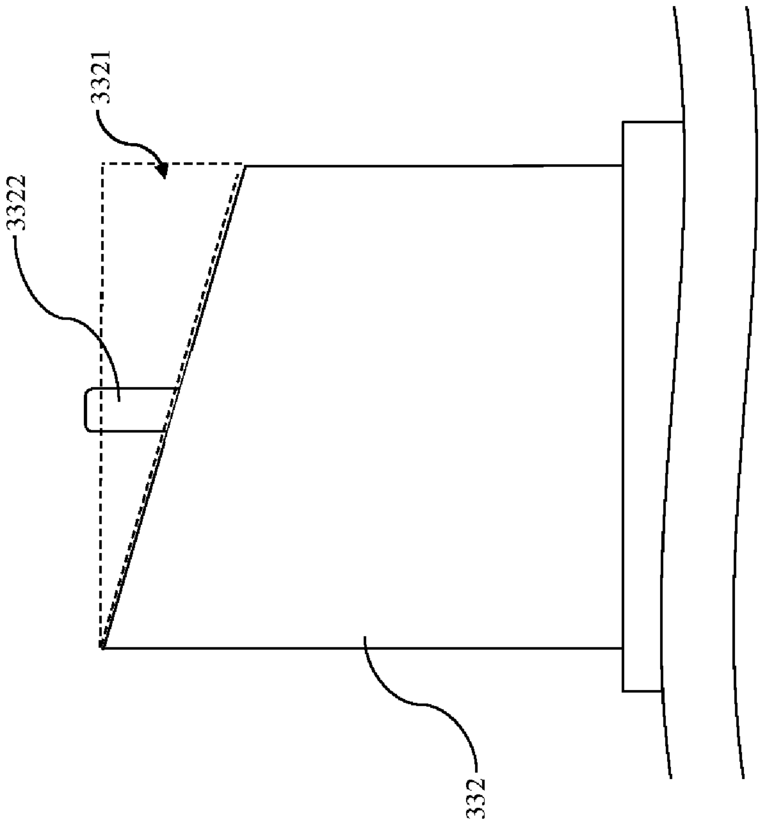
FIG. 18 is a sideview of an end cap of the lighting device having the mistake-proof structure in accordance with the third embodiment of the present invention.

Please refer to FIG. 17 and FIG. 18, which are a perspective view and a side view of an end cap of the lighting device having the mistake-proof structure in accordance with a third embodiment of the present invention respectively. Please also refer to FIG. 1. As shown in FIG. 17 and FIG. 18, the end cap 332 has two conductive pins 3322 and an extending space 3321. The above two conductive pins 3322 are disposed at the two sides of the extending space 3321. In the embodiment, the extending space 3321 is a recess formed by a slope. The above structural design makes the end cap 332 have an inclined surface.

The embodiment just exemplifies the present invention and is not intended to limit the scope of the present invention; any equivalent modification and variation according to the spirit of the present invention is to be also included within the scope of the following claims and their equivalents.

Figure 19:
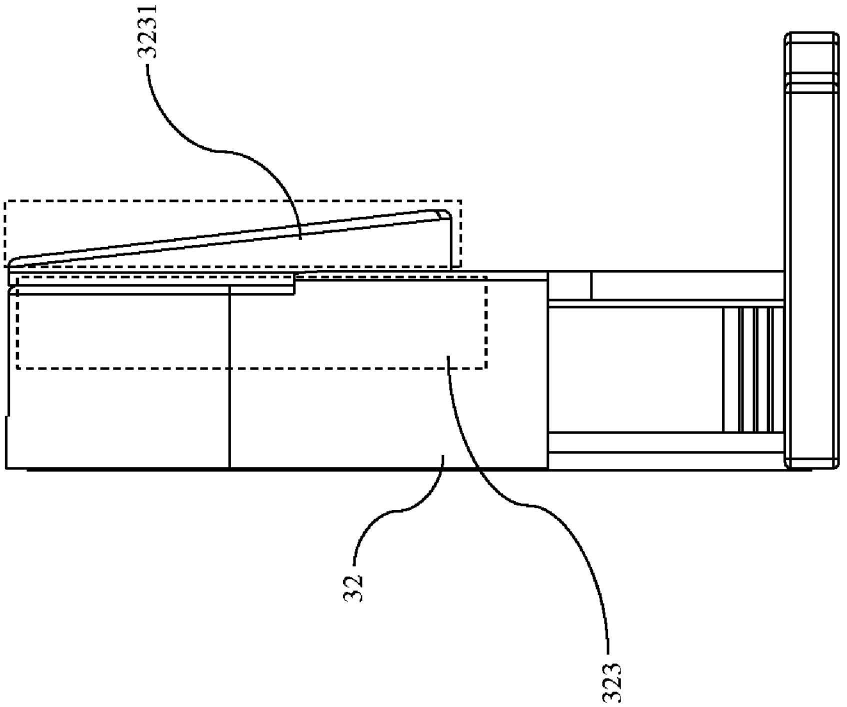
FIG. 19 is a perspective view of a holder of the lighting device having the mistake-proof structure in accordance with the third embodiment of the present invention.

As shown in FIG. 19, which is a perspective view of a holder of the lighting device having the mistake-proof structure in accordance with the third embodiment of the present invention. As shown in FIG. 19, the structure of the holder 32 is similar to the holder of the previous embodiment. The difference between this embodiment and the previous embodiment is that the extending portion of the rotational fixing element 323 of the holder 32 is a positioning slope.

Similarly, the extending portion 3231 of the rotational fixing element 323 can match the extending space 3321 of the end cap 332 so as to provide the mistake-proof function.

The embodiment just exemplifies the present invention and is not intended to limit the scope of the present invention; any equivalent modification and variation according to the spirit of the present invention is to be also included within the scope of the following claims and their equivalents.

It is worthy to point out that currently available light tubes have no a proper mistake-proof structure, so users tend to incorrectly install these light tubes on the holders not matching these light tubes. By contrast, according to one embodiment of the present invention, a lighting device includes two holders and a lighting tube. Each of the holders includes a holder body, two conductive plates disposed in the holder body, and a rotational fixing element disposed in a central recess of the holder body. The rotational fixing element has an extending portion. The light tube is electrically connected to the two conductive plates and having a tube body and two end caps disposed on the two ends of the tube body. The end caps are installed on one of the two holders respectively and each of the end caps has an extending space engaged with the extending portion of the rotational fixing element. The mistake-proof structure formed by the extending spaces of the end caps and the extending portions of the rotational fixing elements effectively provides a mistake-proof function, such that the holder can be only installed with a matching light tube. Consequently, the lighting device will not be damage due to incorrect installation, which significantly enhances the service life of the lighting device.

Also, according to one embodiment of the present invention, the end caps and holders of the lighting device have a special structural design, so the light tube can be stably fixed on the holder. Consequently, the lighting device achieves high structural stability, which can effectively prevent the light tube from falling off the holder. Therefore, the service life of the lighting device can be extended so as to further enhance the safety of the lighting device.

Further, according to one embodiment of the present invention, the rotational fixing element of the holder of the lighting device has an extending portion with a special structural design, such that the extending space of the end cap can be stably engaged with the extending portion of the rotational fixing element. This structural design further enhances the structural stability of the lighting device.

Moreover, according to one embodiment of the present invention, the two conductive pins of each end cap of the light tube are disposed on the two sides of the extending space of the end cap. Therefore, when the user rotates the light tube, the extending portion of the rotational fixing element embedded in the extending space provides appropriate assistance to alleviate the force applied to the two conductive pins. As a result, the conductive pins are less prone to deformation during the user's rotation of the light tube.

Furthermore, according to one embodiment of the present invention, the structural design of the mistake-proof structure in the lighting device is simple, so the lighting device can achieve desired technical effects without significantly increasing the cost thereof. Consequently, the practicality of the lighting device is significantly improved, so the lighting device can be more comprehensive in application and meet actual requirements. As set forth above, the lighting device having the mistake-proof structure according to the embodiments of the present invention can definitely achieve great technical effects.

Figure 20:
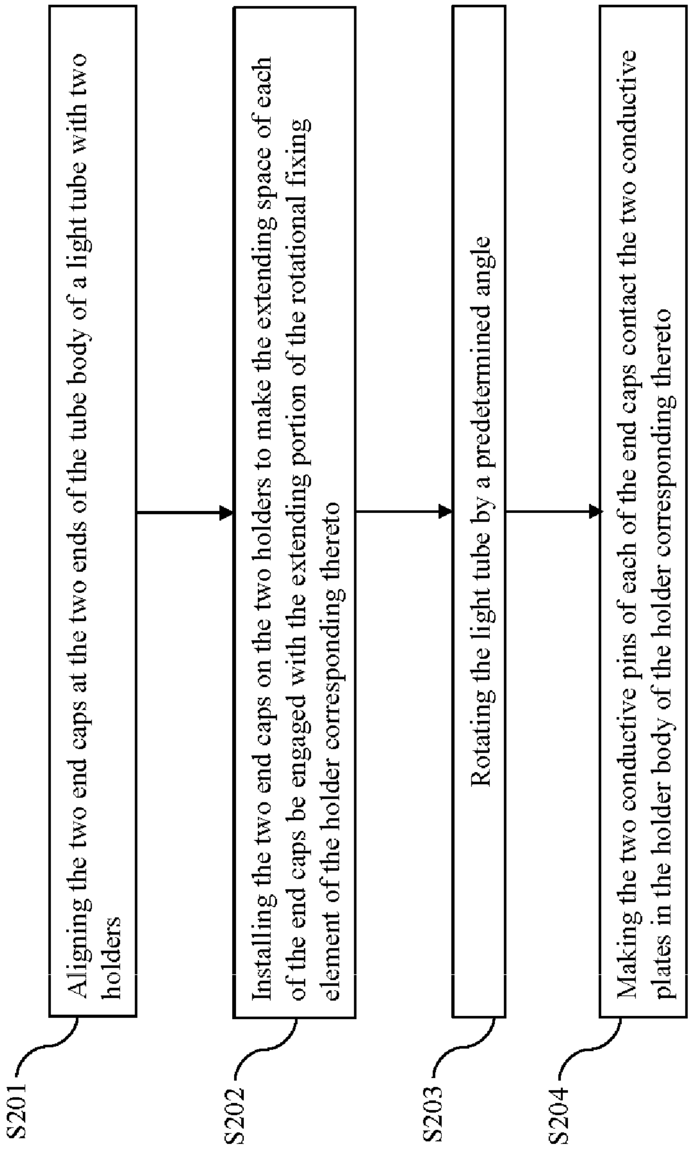
FIG. 20 is a flowchart of a method for installing the lighting device having a mistake-proof structure in accordance with a fourth embodiment of the present invention.

FIG. 20 is a flowchart of a method for installing the lighting device having a mistake-proof structure in accordance with a fourth embodiment of the present invention. As shown in FIG. 20, the method of the embodiment includes the following steps:

Step S201: aligning the two end caps at the two ends of the tube body of a light tube with two holders.

Step S202: installing the two end caps on the two holders to make the extending space of each of the end caps be engaged with the extending portion of the rotational fixing element of the holder corresponding thereto.

Step S203: rotating the light tube by a predetermined angle.

Step S204: making the two conductive pins of each of the end caps contact the two conductive plates in the holder body of the holder corresponding thereto.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Figure 21:
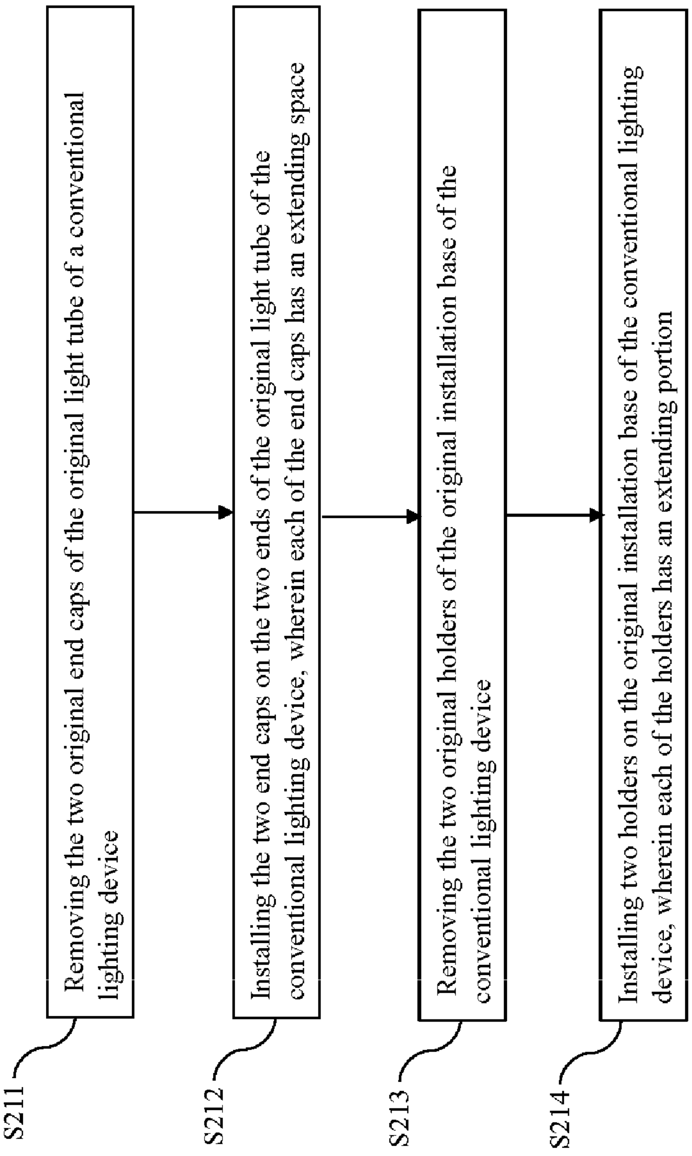
FIG. 21 is a flowchart of a lighting device modifying method in accordance with a fifth embodiment of the present invention.

Please refer to FIG. 21, which is a flowchart of a lighting device modifying method in accordance with a fifth embodiment of the present invention. As shown in FIG. 21, the method of the embodiment includes the following steps:

Step S211: removing the two original end caps of the original light tube of a conventional lighting device.

Step S212: installing the two end caps on the two ends of the original light tube of the conventional lighting device, wherein each of the end caps has an extending space.

Step S213: removing the two original holders of the original installation base of the conventional lighting device.

Step S214: installing two holders on the original installation base of the conventional lighting device, wherein each of the holders has an extending portion.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, a lighting device includes two holders and a lighting tube. Each of the holders includes a holder body, two conductive plates disposed in the holder body, and a rotational fixing element disposed in a central recess of the holder body. The rotational fixing element has an extending portion. The light tube is electrically connected to the two conductive plates and having a tube body and two end caps disposed on the two ends of the tube body. The end caps are installed on one of the two holders respectively and each of the end caps has an extending space engaged with the extending portion of the rotational fixing element. The mistake-proof structure formed by the extending spaces of the end caps and the extending portions of the rotational fixing elements effectively provides a mistake-proof function, such that the holder can be only installed with a matching light tube. Consequently, the lighting device will not be damage due to incorrect installation, which significantly enhances the service life of the lighting device.

Also, according to one embodiment of the present invention, the end caps and holders of the lighting device have a special structural design, so the light tube can be stably fixed on the holder. Consequently, the lighting device achieves high structural stability, which can effectively prevent the light tube from falling off the holder. Therefore, the service life of the lighting device can be extended so as to further enhance the safety of the lighting device.

Further, according to one embodiment of the present invention, the rotational fixing element of the holder of the lighting device has an extending portion with a special structural design, such that the extending space of the end cap can be stably engaged with the extending portion of the rotational fixing element. This structural design further enhances the structural stability of the lighting device.

Moreover, according to one embodiment of the present invention, the two conductive pins of each end cap of the light tube are disposed on the two sides of the extending space of the end cap. Therefore, when the user rotates the light tube, the extending portion of the rotational fixing element embedded in the extending space provides appropriate assistance to alleviate the force applied to the two conductive pins. As a result, the conductive pins are less prone to deformation during the user's rotation of the light tube.

Furthermore, according to one embodiment of the present invention, the structural design of the mistake-proof structure in the lighting device is simple, so the lighting device can achieve desired technical effects without significantly increasing the cost thereof. Consequently, the practicality of the lighting device is significantly improved, so the lighting device can be more comprehensive in application and meet actual requirements.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for installing a lighting device having a mistake-proof structure, comprising:

aligning two end caps at two ends of a tube body of a light tube with two holders;

installing the two end caps on the two holders to make an extending space of each of the end caps be engaged with an extending portion of a rotational fixing element of the holder corresponding thereto, wherein the extending space is a groove, and has two inclined bottom surfaces and a bottom plane disposed between the two inclined bottom surfaces, and a top end of the extending space has two buffer surfaces; and making two conductive pins of each of the end caps contact two conductive plates in a holder body of the holder corresponding thereto.

2. The method for installing the lighting device having the mistake-proof structure as claimed in claim 1, wherein a step of installing the two end caps on the two holders to make the extending space of each of the end caps be engaged with the extending portion of the rotational fixing element of the holder corresponding thereto further comprises:

making the two conductive pins of each of the end caps pass through two top holes of the holder body of the holder corresponding thereto; and inserting the two conductive pins of each of the end caps into two positioning grooves of the rotational fixing element of the holder corresponding thereto.

3. The method for installing the lighting device having the mistake-proof structure as claimed in claim 1, wherein a step of making two conductive pins of each of the end caps contact the two conductive plates in the holder body of the holder corresponding thereto further comprises:

rotating the light tube by a predetermined angle.

4. The method for installing the lighting device having the mistake-proof structure as claimed in claim 1, wherein the extending portion is a positioning plate.

5. A lighting device modifying method, comprising:

removing two original end caps of an original light tube of a conventional lighting device;

installing two end caps on two ends of the original light tube of the conventional lighting device, wherein each of the end caps has an extending space, wherein the extending space is a groove, and has two inclined bottom surfaces and a bottom plane disposed between the two inclined bottom surfaces, and a top end of the extending space has two buffer surfaces;

removing two original holders of an original installation base of the conventional lighting device; and installing two holders on the original installation base of the conventional lighting device, wherein each of the holders has an extending portion.

6. The lighting device modifying method as claimed in claim 5, wherein the extension space is a groove.

7. The lighting device modifying method as claimed in claim 5, wherein the extending portion is a positioning plate.

8. A lighting device having a mistake-proof structure, comprising:

two holders, wherein each of the holders comprises a holder body, two conductive plates disposed in the holder body, and a rotational fixing element disposed in a central recess of the holder body, wherein the rotational fixing element has an extending portion; and a light tube electrically connected to the two conductive plates and having a tube body and two end caps disposed on two ends of the tube body, wherein the end caps are installed on one of the two holders respectively and each of the end caps has an extending space engaged with the extending portion of the rotational fixing element, wherein the extending space is a groove, and has two inclined bottom surfaces and a bottom plane disposed between the two inclined bottom surfaces, and a top end of the extending space has two buffer surfaces.

9. The lighting device having the mistake-proof structure as claimed in claim 8, wherein the extending space is a groove.

10. The lighting device having the mistake-proof structure as claimed in claim 8, wherein each of the end caps further has two conductive pins inserted into the rotational fixing element corresponding thereto, whereby the two conductive pins contact the two conductive plates.

11. The lighting device having the mistake-proof structure as claimed in claim 10, wherein the two conductive pins are respectively disposed on two sides of the extending space.

12. The lighting device having the mistake-proof structure as claimed in claim 8, wherein the extending portion is a positioning plate.

13. A holder having a mistake-proof structure, comprising:

a holder body;

two conductive plates disposed in the holder body; and a rotational fixing element disposed in a central recess of the holder body and having an extending portion, wherein the extending portion is a positioning plate configured to be engaged with an extending space of an end cap, and the extending space is a groove, wherein the extending space has two inclined bottom surfaces and a bottom plane disposed between the two inclined bottom surfaces, and a top end of the extending space has two buffer surfaces.

14. The holder having the mistake-proof structure as claimed in claim 13, wherein the central recess of the holder body is provided with a central post, and the rotational fixing elements has a central hole, wherein the central post passes through the central hole, whereby the rotational fixing element is rotationally connected to the central post.

15. A light tube having a mistake-proof structure, comprising:

a tube body; and two end caps disposed at two ends of the tube body, wherein each of the end caps has an extending space and two conductive pins, wherein the extending space is a groove, and has two inclined bottom surfaces and a bottom plane disposed between the two inclined bottom surfaces, and a top end of the extending space has two buffer surfaces.

16. The light tube having the mistake-proof structure as claimed in claim 15, wherein the two conductive pins are disposed on one side of the extending space.

17. The light tube having the mistake-proof structure as claimed in claim 15, wherein the two conductive pins are respectively disposed on two sides of the extending space.

* * * * *